US008903034B2

(12) United States Patent
Junker

(10) Patent No.: US 8,903,034 B2
(45) Date of Patent: Dec. 2, 2014

(54) FUEL ROD INTERNAL PRESSURE MEASUREMENT

(75) Inventor: Warren R. Junker, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1959 days.

(21) Appl. No.: 12/124,398

(22) Filed: May 21, 2008

(65) Prior Publication Data

US 2010/0040186 A1 Feb. 18, 2010

(51) Int. Cl.
*G21C 17/07* (2006.01)
*G21C 17/06* (2006.01)

(52) U.S. Cl.
CPC ............... *G21C 17/06* (2013.01); *G21C 17/07* (2013.01)
USPC ............................. 376/251; 376/245; 376/247

(58) Field of Classification Search
USPC ......................................................... 376/251
See application file for complete search history.

(56) References Cited

U.S. PATENT DOCUMENTS

| 2,969,674 | A | * | 1/1961 | Ogle | .................................. | 374/6 |
| 3,222,917 | A | * | 12/1965 | Roth | .................................. | 374/5 |
| 4,039,376 | A | | 8/1977 | Wachter | | |
| 4,048,499 | A | * | 9/1977 | Kreuzer | ......................... | 250/344 |
| 5,235,624 | A | | 8/1993 | Bordy et al. | | |
| 5,539,789 | A | | 7/1996 | Wachter | | |
| 5,544,208 | A | | 8/1996 | Pao et al. | | |
| 5,638,414 | A | | 6/1997 | Enokido et al. | | |
| 5,790,617 | A | | 8/1998 | McClelland | | |
| 6,493,413 | B1 | | 12/2002 | Galioto et al. | | |
| 2005/0029460 | A1 | * | 2/2005 | Iwatschenko-Borho et al. | .......................... | 250/359.1 |

FOREIGN PATENT DOCUMENTS

| JP | 10300886 | A | * | 11/1998 | ............. | G21C 17/06 |
| RU | 204931 | C1 | * | 1/1992 | ............. | G01L 11/00 |
| SU | 1306295 | A | * | 4/1991 | ............. | G01L 11/00 |
| SU | 1363945 | A | * | 7/1991 | ............. | G01L 11/00 |
| SU | 1367667 | A | * | 8/1991 | ............. | G01L 11/00 |
| SU | 1362229 | A1 | * | 9/1991 | ............. | G01L 11/00 |

OTHER PUBLICATIONS

Computerized translation, from Japanese Patent Office, of Nakatsuka, Masafumi, JP-10300886-A, item O above, full contents.*
Park et al., "Hopf bifurcations of viscoelastic fluids heated from below", Journal of Non-Newtonian Mechanics, vol. 66, pp. 1-34 (1996).*

(Continued)

*Primary Examiner* — Johannes P Mondt
(74) *Attorney, Agent, or Firm* — Joseph C. Spadacene; Westinghouse Electric Company LLC

(57) ABSTRACT

A method for determining a leaking nuclear fuel rod that remotely measures the internal pressure in the plenum region of the fuel rod by remotely measuring the thermal response of the rod when a localized heating is imposed on the outside of the rod in the plenum region. The temperature of the cladding at two symmetrically spaced points on either side of the location where the heating is imposed is remotely monitored as a function of time and compared to a standard to determine the internal pressure of the plenum.

13 Claims, 8 Drawing Sheets

(56) References Cited

OTHER PUBLICATIONS

Translation by Schreiber Translations, Inc., for the Translations Branch of the U.S.P.T.O of Bibilashvili et al as cited in the appealed office Action, naming Pastuchin as first author, i.e., V.V. Pastuchin et al "Method for Determining Gas Pressure in Sealed Thin-Walled Objects", SU-1306295-A1, published Apr. 7, 1991.*

Pastushin, V.V. et al., "Elaboration of the Thermophysical Instruments for Non-Destructive Examination of Tightness and Gas Parameters Inside Power Reactor Fuel Rods", 14th World Conference on Non Destructive Testing (14th WCNDT), Dec. 1996), pp. 317-321, New Delhi, India.

International Atomic Energy Agency, Poolside inspection, repair and reconstitution of LWR fuel elements, Proceedings of a Technical Committee meeting held in Bad Zurzach, Switzerland, Oct. 7-10, 1997, pp. 41-51, Vienna, Austria.

W.H. Leong, et al., On a physically-realizable benchmark problem in internal natural convection, International Journal of Heat and Mass Transfer, (1998) pp. 3817-3828, Waterloo, Ontario, Canada.

* cited by examiner

FUEL ROD INTERNAL PRESSURE MEASUREMENT

BACKGROUND OF THE INVENTION

1. Field of the Invention

The present invention relates to the inspection of nuclear fuel rods, and assemblies of fuel rods, to detect and locate defective rods.

2. Related Art

The large nuclear reactors utilized for power generation employ an array of a large number of fuel rods containing nuclear fuel. Each rod comprises a metal tube or sheath which may be from 8 to 15 feet long and approximately ½ inch in diameter, and which contains a stack of cylindrical fuel pellets of suitable fissionable material such as uranium oxide. The upper end of the tube is empty of fuel pellets and forms a plenum for a gas or other fluid under substantial pressure which fills the top of the rod and also a small clearance space which is provided around the fuel pellets to allow for expansion or swelling as a result of irradiation. The fuel rods are supported in parallel groups in fuel assemblies which may typically contain upwards of 300 fuel rods, and the complete nuclear reactor is made up of a large number of these fuel assemblies arranged in a suitable configuration in an active core.

The metal tubes of the fuel rods, also known as cladding, constitute the primary containment boundary for the radioactive nuclear fuel, and inspection to verify the integrity of the rods is of primary importance. In the manufacture of the fuel rods, the tubing itself and the end cap welds are carefully inspected and helium leak tested. Since a nuclear reactor may contain upwards of 40,000 fuel rods, a probability exists that some number of defective tubes will be present even with a highly effective manufacturing quality control program. Furthermore, even initially good fuel rods may develop cracks, pinholes or other defects in service and such defective rods must be detected.

The reactor is usually shut down approximately every 12 to 24 months for refueling. During the refueling outage, as well as during initial installation, the fuel rods must be inspected to detect any defective rods that may be leaking fission products. The reactor and the fuel assemblies are immersed in a pool of water during the refueling operations and during removal of the fuel assemblies for replacement or inspection. In the standard method of inspection known as sipping, which has been used heretofore, the flow of water through each fuel assembly to be inspected is blocked so as to allow the fuel rods to heat up, which causes expulsion of fission products into the water through any defects that may exist in the rods. The water is then checked to detect the presence of radioactivity, indicating that such a leakage of fission products has occurred and that a defective rod is present in the assembly being tested. This system requires that the water be pumped to a sampling station and repeatedly analyzed or checked for radioactivity and is a very slow procedure requiring as much as an hour for each assembly. Complete inspection of all fuel assemblies in a large power reactor is, therefore, very time consuming during which the reactor is out of service.

Fission products leaking from failed fuel assemblies can cause many conditions that increase operating costs. These conditions include (1) high radiation readings in the primary coolant system; (2) increased volume of liquid radioactive waste; (3) increased volume of solid radioactive waste due to more frequent demineralizer bed replacement; (4) increased costs for disposal of spent fuel assemblies due to special handling and additional decontamination; and (5) increased exposure to personnel. These increased costs outweigh the costs incurred by testing the assemblies. Currently, the fuel assemblies are tested using fuel "sipping" as mentioned above. A positive finding indicates the presence of a leaking rod, or rods, within an assembly but does not pinpoint the specific culprit. To narrow the leakage to a specific rod, sipping is supplemented by an ultrasonic technique that looks for evidence of water inside the individual rods. Once identified, the leaking fuel rod may be extracted from the assembly and replaced with a dummy rod to allow the eventual reload of the assembly in the core. If identification of the specific degradation mechanism that resulted in the leakage is desired, the assembly can be prepared so that the rods can be extracted and a variety of inspections conducted on the individual rods. Individual rod inspections include high resolution visual inspection, eddy current inspection and ultrasonic inspection, looking for discontinuities in the cladding rather than the presence of water. While the time requirements for sipping and ultrasonic testing for a single assembly does not seem significant, the time for testing an entire core is approximately two days. With increasing pressure to decrease outage durations, the nuclear industry will benefit immensely from a leak detection system that would reduce the time required to locate leaking assemblies and especially leaking fuel rods.

SUMMARY OF THE INVENTION

This invention provides an improved method for detecting a leaking fuel rod by measuring the fuel rods' internal pressure. At beginning of life the rod is pressurized to on the order of 100-250+ psi (7-17.6 km/cm$^2$). As fission gases evolve the pressure in the rod increases. A leak in the rod then allows the pressure inside the rod to decrease from its nominal pressure, above that to which it was initially pressurized, and fall to close to the ambient pressure surrounding the rod. This invention detects a leaking fuel rod by detecting this change in pressure within the rod due to a leak by measuring the thermal response of the fuel rod. Generally, in accordance with the method of this invention heat is applied from an outside, remote, point source to a portion of the cladding surface of the fuel rod within the plenum area. The temperature of the cladding along the plenum at two (or more) spaced axial locations within the plenum area is monitored by remote sensors as a function of time. The difference in temperature between the two (or more) spaced locations as a function of time is then determined and that difference over time is plotted. The integrity of the fuel rod is determined by comparing the thermal response as a function of time that was monitored with different corresponding responses obtained from a standard at different relative pressures. In one preferred embodiment this standard would be provided by the remaining inspected rods in the assembly being inspected (only a very limited fraction of rods in an assembly being possibly a leaker).

Preferably the two (or more) spaced axial locations are on either side of the portion of the cladding surface that the heat was applied to. Desirably, the two (or more) spaced axial locations are symmetrically on either side of the portion of the cladding surface that the heat was applied to. In one embodiment two spaced locations are 0.38 in. (0.97 cm) on either side of the portion of the cladding surface that the heat was applied to. In a second embodiment two spaced locations are 0.82 in. (2.08 cm) on either side of the portion of the cladding surface that the heat was applied to. In a third embodiment several symmetric locations on either side of the portion of the cladding surface that the heat was applied to are monitored to improve the reliability of the signal. Preferably the heat was applied from a remote, point source such as a laser. Effective monitoring can be achieved over a time period of approximately 15 to 60 seconds thereby substantially improving the efficiency of the leak detection process.

Accordingly, the method of this invention determines the integrity of a nuclear fuel rod by remotely measuring the thermal response of a gas inside the fuel rod as a function of time and comparing that response over time to a standard to determine whether the temperature of the gas decreased over time slower than the standard. The measurement is performed remotely so that the rods in the fuel assembly can be scanned without taking apart the fuel assembly.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
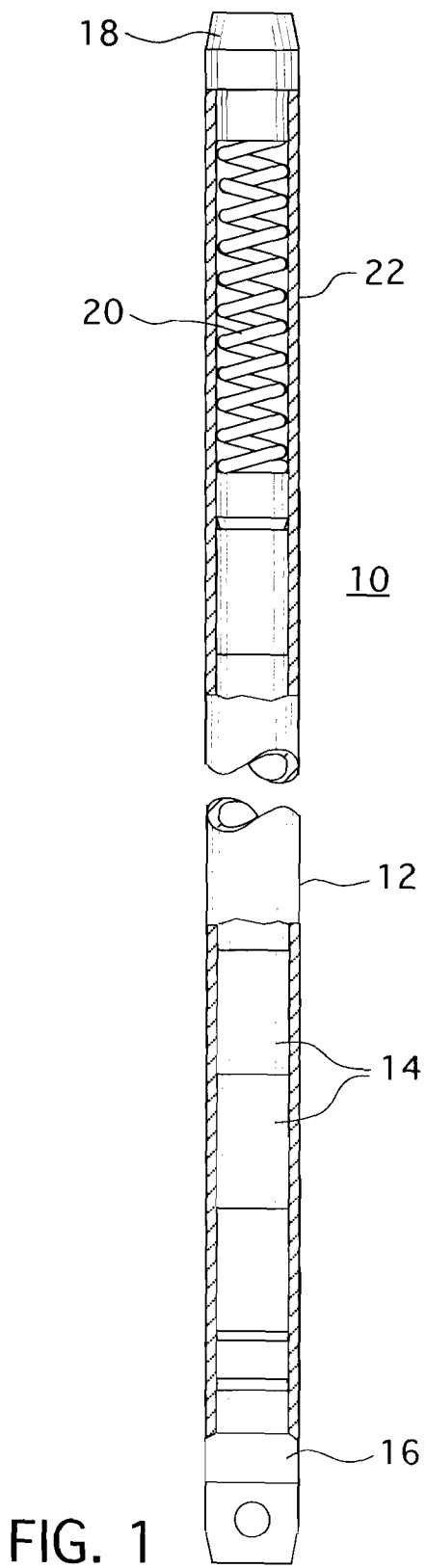
FIG. 1 is a sectional view of a typical nuclear fuel rod.

A typical nuclear fuel rod is shown by way of example in FIG. 1. The fuel rod 10 comprises a metal tubular cladding 12 of a suitable alloy such as Zircaloy capable of withstanding the severe conditions to which it is subjected during operation, and is usually of considerable length, such as from 8 to 15 ft. (2.4 to 4.6 meters), and of relatively small diameter which may be in the order of ½ in. (12.7 mm). The tube 12 is filled for most of its length with nuclear fuel pellets 14 which may be made of uranium oxide or other suitable nuclear fuel, and which are of a diameter to fit closely within the tube 12 with a very small radial clearance to accommodate pellet growth. The tube 12 is closed at the top and bottom by upper and lower end caps 18 and 16 respectively, which are welded in place to form a leak-tight closure. The fuel pellets 14 are disposed in a vertical column extending through most of the length of the tube 12 but with an empty space or plenum at the top. A spring 20 is disposed in this plenum to hold the column of fuel pellets in position. The plenum in the top of the tube 12, and the small clearance between the pellets 14 and the tube 12, are filled with a fluid which is usually gas, and which usually will contain fission products during and after operation within a reactor core. This fluid in the tube 12 is normally maintained under substantial pressure typically in the order of 100-250 psi (7-17.6 km/cm$^2$) at the beginning of life (prior to operation within a reactor core) and further increasing during operation as fission products are generated in the fuel.

As previously mentioned, the inspection of nuclear fuel is typically accomplished during the refueling cycle and is aimed at detecting the presence of leaking fuel assemblies. Leakage can originate from various mechanisms and can occur anywhere over the entire length of the fuel cladding. Several inspection technologies are in use to assess fuel integrity. The most rapid technique currently implemented involves looking for the presence of radioactive material leaking from the assembly (the sipping process previously noted) as the assembly is moved from the core to spent fuel storage. A positive finding indicates the presence of a leaking fuel rod within an assembly but does not pinpoint the specific culprit. To narrow the leakage to a specific rod, sipping is supplemented by an ultrasonic technique that looks for evidence of water inside the individual rods. If identification of the specific degradation mechanism that resulted in the leakage is desired, the fuel assembly can be prepared so that the rods can be extracted and a variety of inspections conducted on the individual rods. Individual rod inspections have included high resolution visual inspection, eddy current inspection and ultrasonic inspection; looking for discontinuities in the cladding rather than the presence of water. An alternate method to detect a leaking rod would be to measure the rods' internal pressure. As previously noted, at the beginning of life the rod is pressurized. As fission gases evolve the pressure in the rod increases. A leak in the fuel rod 10 then allows the pressure inside the rod to decrease from its nominal value, above that to which it was initially pressurized and fall to the ambient pressure surrounding the rod. This invention addresses the assessment of rod integrity by measuring the rod internal pressure through the thermal response of the gas inside the rod.

Figure 2:
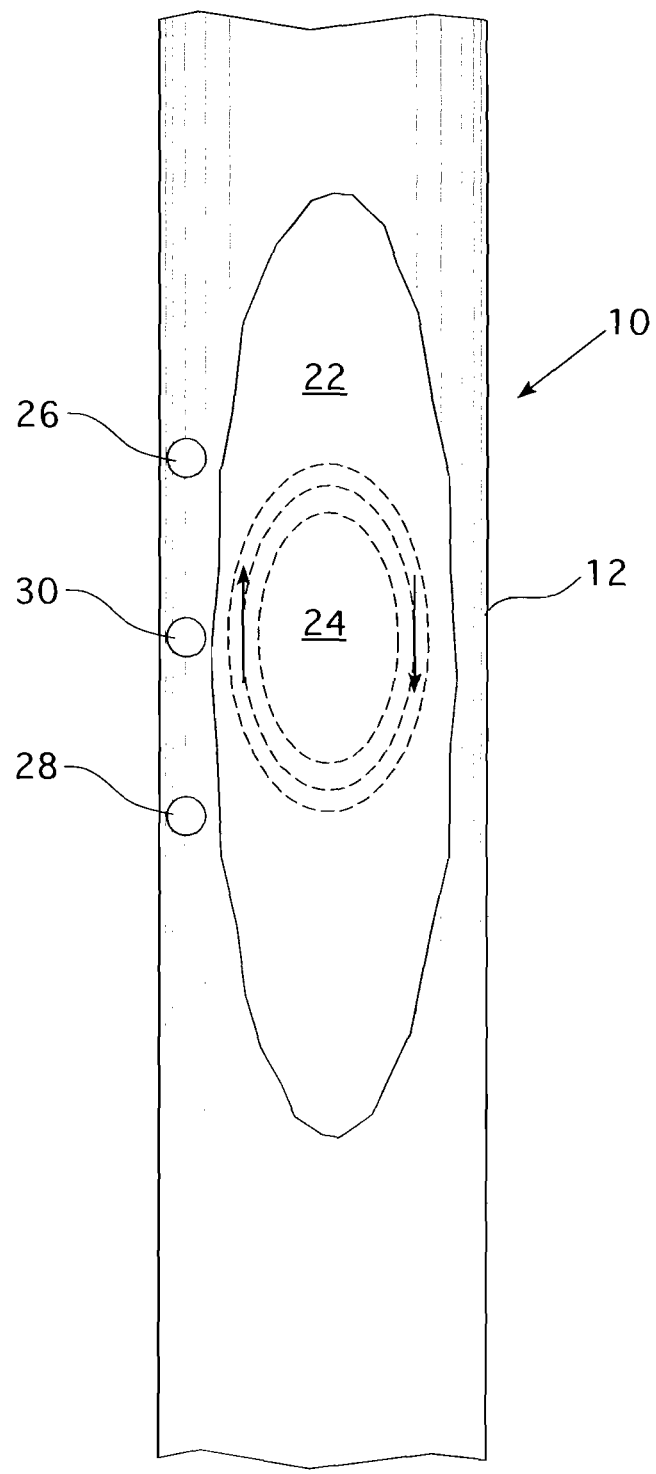
FIG. 2. is a schematic of the plenum region of a fuel rod illustrating the convection cell set-up within the fuel rod by the external heat source that results in a temperature difference between the two measurement points of this invention.

In accordance with this invention the measurement of the thermal properties of the gas in the plenum region 22 of the fuel rod 10 is accomplished by the application of heat to the outside of the cladding. The heated portion of the rod produces a convection cell 24 (figuratively shown in FIG. 2) within the cladding 12 that produces a measurable temperature difference at points above at 26 and below at 28 the heated region 30. The temperature difference is related to the pressure of the helium gas within the volume of the plenum 22. Thus, a leaking rod could be detected by its thermal response. The thermal technique then provides a direct measure of the pressure within the rod and, therefore, whether the fuel clad 12 has been breached.

Figure 3:
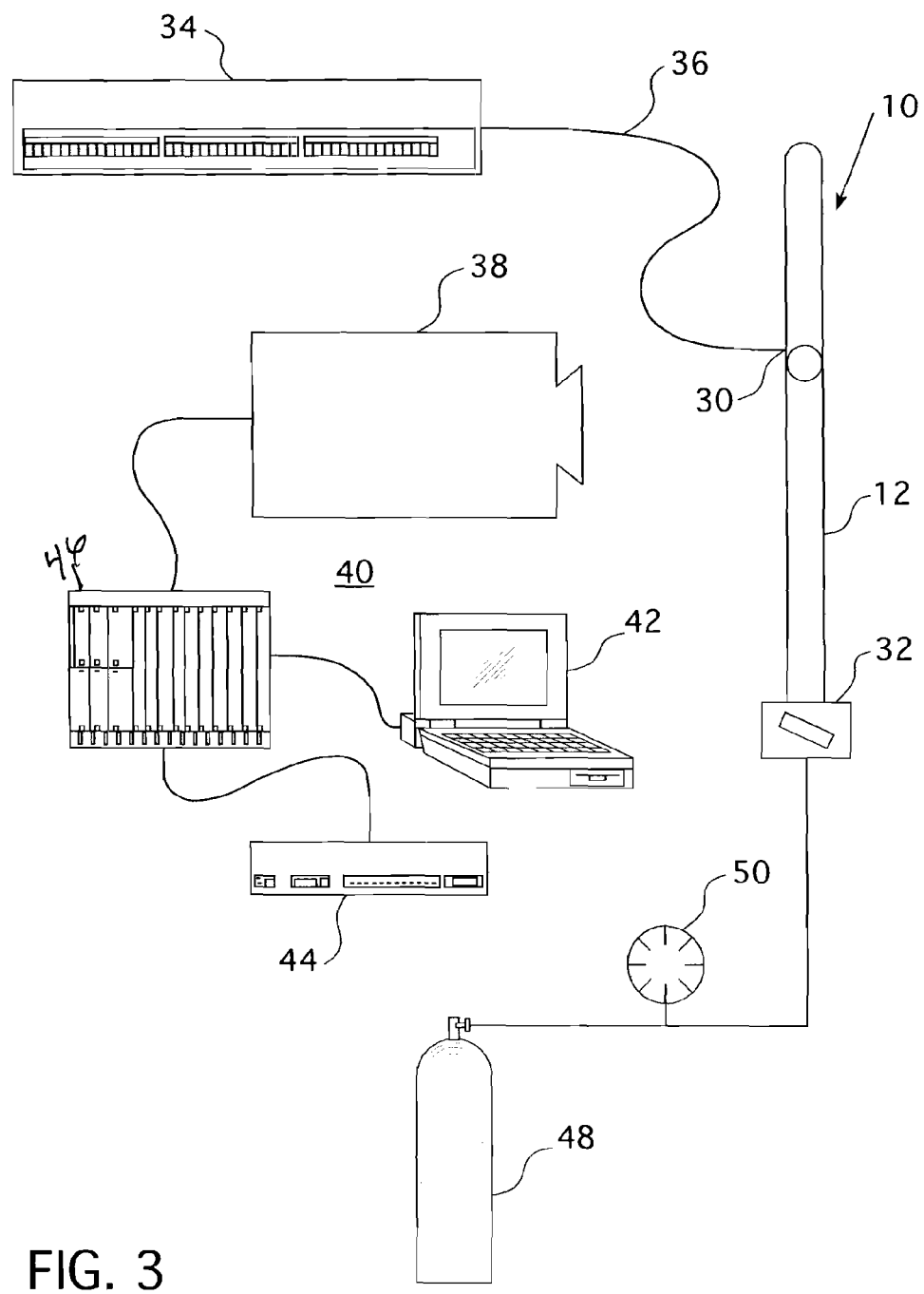
FIG. 3 is a schematic block diagram of a system used to demonstrate the method of this invention.

To demonstrate the concept of this invention an experimental apparatus was assembled as shown in FIG. 3. Two cases were considered. The first was a simple open tube (representing the fuel clad 12) with a set of fittings and a valve 32. The tube 12 was pressurized to the desired level and isolated with the valve 32 from the pressurization system 48 and 50. FIG. 3 shows a block diagram of the system. The fuel clad 12 was spray painted flat black to eliminate emissivity variations and mounted in a fixture that held it vertically. For this experiment light from a remote laser 34 was delivered to the surface of the cladding 12 with a fiber optic cable and lens system 36. The surface of the cladding 12 was monitored using an infrared (IR) sensitive camera 38.

Figure 4:
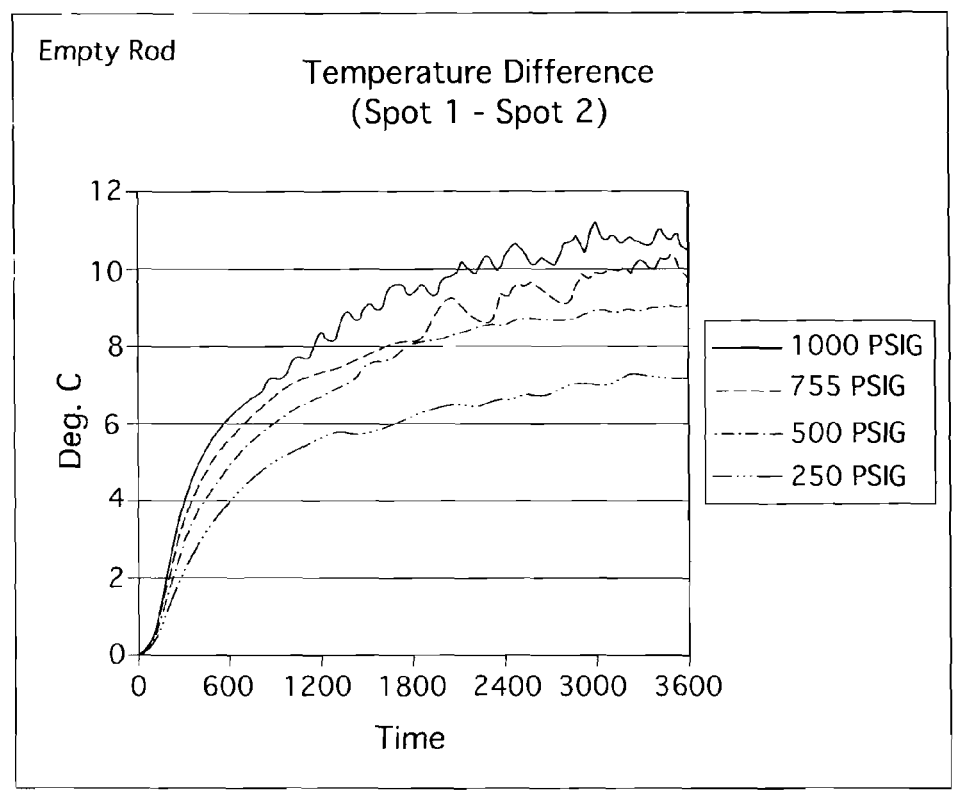
FIG. 4 is a graphical plot of the thermal response of the plenum at various pressures for monitored locations spaced 0.38 in. (0.97 cm) above and below the heated region.
Figure 5:
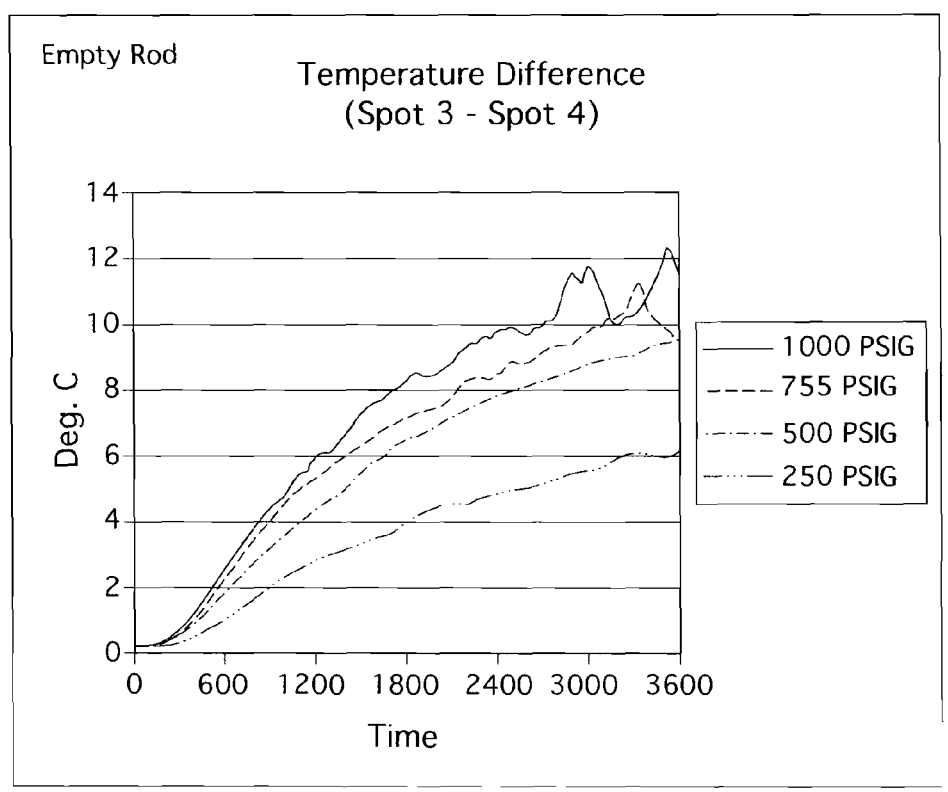
FIG. 5 is a graphical plot of the thermal response of the plenum at various pressures for monitored locations spaced 0.82 in. (2.08 cm) above and below the heated region.

The data acquisition procedure was to, first, pressurize the tube 12 to the desired level, then start the IR system 40 recording images and, finally, turn on the laser 34. The surface of the cladding 12 rapidly heated at the point location 30 where the laser lens directed the beam and the IR system 40 recorded the temperature distribution at a rate of 60 images per second. Images were displayed on a computer 42 and stored on a hard disk 44 both of which interface with the signal conditioning circuits 46 that was connected to the infrared camera 38. The images were stored for subsequent review. Typically, the image capturing process lasted approximately one minute. The IR system allows for a number of analysis options. For this set of experiments, five locations within the images, at which the temperature of the tube surface 12 was measured, were evaluated and output to a spreadsheet on the computer 42 for data plotting. The selected measurement locations were at the point 30 where the laser light struck the tube surface 12 and at symmetric points above 26 and below 28 the heated location 30. The locations were 0.38 inches (0.97 cm) and 0.82 inches (2.08 cm) above and below the center of the heated region 30. FIG. 4 is a plot of the temperature difference between the closer pair of upper and lower points 26 and 28 as a function of time and at different pressures. The temperature difference rises rapidly and increases more as the pressure increases. However, after about 20 seconds (1,200 frames) variations in the temperature difference are noted. The onset of these fluctuations appears later as the pressure decreases. FIG. 5 shows a plot of the temperature difference at the outer two locations, i.e. 0.82 inch (2.08 cm) on either side of the heated zone 30. While the final temperature difference is similar to the closer points shown in FIG. 4 the rate at which it is achieved is somewhat slower. Again, instabilities in the temperature difference are observed although they appear to grow with time and have a larger amplitude than that of the closer points. From these measurements it is clear that there is ample temperature difference of the rod response to different internal pressure levels to employ this method as a viable inspection tool.

Figure 6:
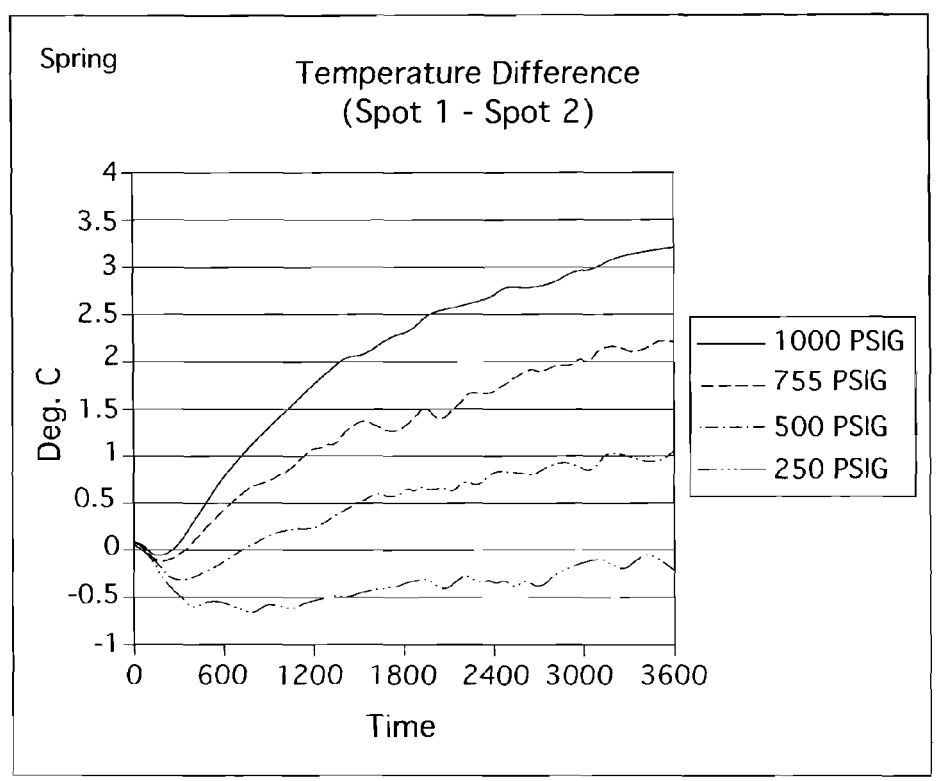
FIG. 6 is a graphical plot of the thermal response of the plenum with an internal spring, at various pressures for monitored locations spaced 0.38 in. (0.97 cm) above and below the heated region.
Figure 7:
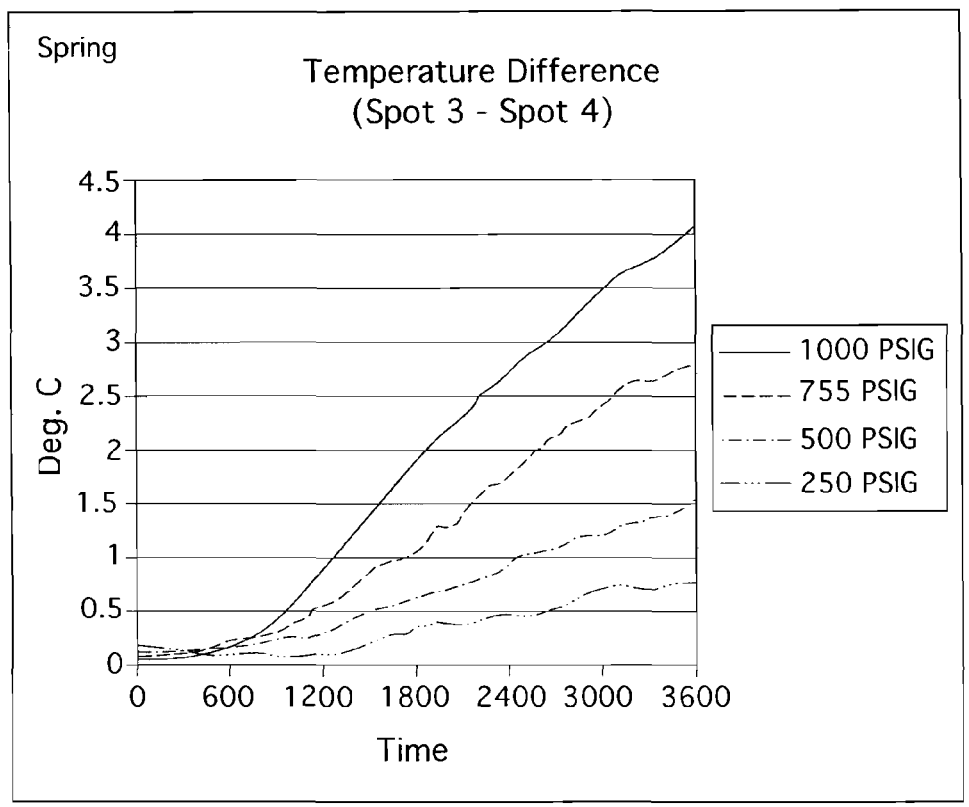
FIG. 7 is a graphical plot of the thermal response of the plenum with an internal spring, at various pressures for monitored locations spaced 0.82 in. (2.08 cm) above and below the heated region.

A second mock-up, which was nearly identical to that shown in FIG. 3. except that the cladding 12 contained simulated fuel pellets 14 and a plenum spring 20 (shown in FIG. 1), was tested to determine the impact of the presence of the spring 20 on the measurements. The second mock-up took the place of the one shown in FIG. 3 and a similar set of measurements was obtained. The data were analyzed in the same way as the data from the first mock-up. FIG. 6 shows the results for the two closest measurement points while FIG. 7 shows the results for the more widely spaced measurement points. In both cases the total temperature difference is reduced as compared with the empty tube case 12 that was employed in the first mock-up and the response for the lowest pressure case at the closer spaced points shows only a minimal temperature difference. Further testing is required to determine the precise mechanism by which the spring is impacting the measurements. However, it is expected that the spring is reducing the influence of the convection process within the tube 12 by significantly altering the internal convection cell 24 shown in FIG. 2, either simply by its presence or by its thermal conductivity spreading out and reducing the localized heating. Despite the reduction in response there is still a sufficient pressure dependent response to support using the concept of this invention as a viable tool for measuring leakage of the gas within the fuel rod.

Figure 8:
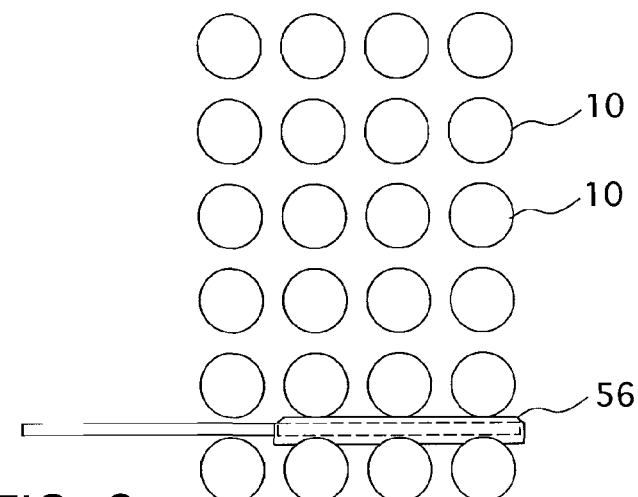
FIG. 8 is a schematic illustration of a bladder for isolating a row of fuel rods to be inspected.
Figure 9:
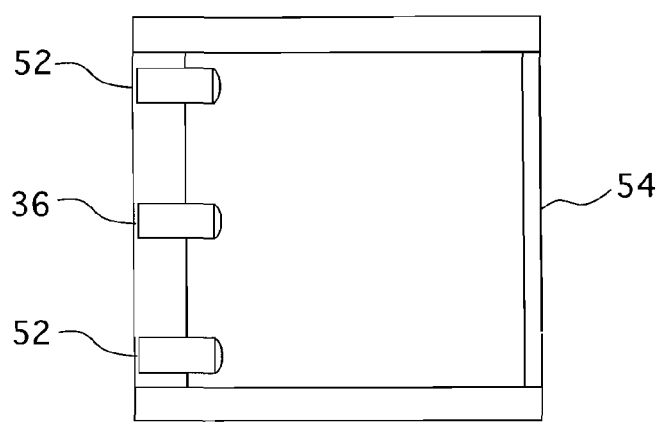
FIG. 9 is a schematic of a non-contact measurement tool which can be employed to perform the method of this invention.

The foregoing simple measurements demonstrate the efficacy of measuring pressure within a fuel rod using thermal techniques that are applied remotely. While the presence of the spring greatly reduces the response there is still a sufficient dependence on pressure to employ this method as a viable measurement tool. As the industry moves forward and implements spring clips instead of springs for exerting pressure on the fuel pellet stack, the measurement of pressure within the fuel rod would become simpler and more accurate. FIG. 9 shows one embodiment for implementing the remote thermal system measurement of this invention in the field. The embodiment shown in FIG. 9 involves the use of infrared thermometers 52 in conjunction with a mirror 54 and laser 36 for remotely heating and measuring the temperature of the cladding surface of the fuel rod. As illustrated in FIG. 8 a bladder 56 can be used to isolate a row of fuel rods 10 and the mirror 54 can be programmed to scan an individual row to obtain measurements and plots from each of the rods in a given row. The implementation shown in FIG. 9 requires that the water be excluded from the measurement region during the test, but enables an entire row of fuel rods to be scanned in a minimum amount of time. Thus the invention improves on the time required to identify specific leaking fuel rods in an entire fuel assembly.

While specific embodiments of the invention have been described in detail, it will be appreciated by those skilled in the art that various modifications and alternatives to those details could be developed in light of the overall teachings of the disclosure. For example, other means of heating and determining the temperature difference could be employed without departing from the invention. Accordingly, the particular embodiments disclosed are meant to be illustrative only and not limiting as to the scope of the invention, which is to be given the full breadth of the appended claims and any and all equivalents thereof.

What is claimed is:

1. A method of measuring the integrity of an elongated nuclear fuel rod having an axial dimension by a thermal response of a gas within a plenum of the fuel rod comprising the steps of:
   applying heat from an outside, remote, non-contact source to a portion of a cladding surface of the fuel rod within a plenum area;
   remotely monitoring a temperature of the cladding surface along the plenum at at least four spaced axial locations within the plenum area, as a function of time over a period of approximately one minute or less, the four spaced locations being divided into at least two sets of two spaced locations each;
   determining the difference in temperature between the two spaced locations in each set as a function of time employing a non contact sensor; and
   comparing that difference to a standard to determine the integrity of the fuel rod.

2. The method of claim 1 wherein the comparing step determines the relative pressure of the gas within the plenum.

3. The method of claim 1 wherein the two spaced axial locations in each of the two sets are on either side of the portion of the cladding surface that the heat was applied to.

4. The method of claim 3 wherein the two spaced axial locations in each set are situated symmetrically on either side of the portion of the cladding surface that the heat was applied to.

5. The method of claim 4 wherein the two spaced locations in one of the two sets are 0.38 in. (0.97 cm.) on either side of the portion of the cladding surface that the heat was applied to.

6. The method of claim 4 wherein the two spaced locations in another of the two sets are 0.82 in. (2.08 cm.) on either side of the portion of the cladding surface that the heat was applied to.

7. The method of claim 1 wherein the applying step remotely applies heat from a point source.

8. The method of claim 7 wherein the point source is a laser.

9. The method of claim 1 wherein the monitoring step is performed with an infrared system.

10. A method of determining the integrity of a nuclear fuel rod within a fuel assembly comprising the steps of:
   Remotely heating a cladding surrounding a gas plenum of the fuel rod with a point heating source;
   Remotely measuring a thermal response of a gas inside the fuel rod as a function of time;
   comparing the thermal response over time to a standard;
   determining whether the temperature of the gas decreased over time slower than the standard; and
   wherein the remotely heating and remotely measuring steps are performed successively on each fuel rod in a row of the fuel assembly so as to scan the row.

11. The method of claim 10 wherein the thermal response is measured by remotely determining the temperature difference between two spaced points in each of at least two sets along an axial dimension in a plenum area of the nuclear fuel rod.

12. The method of claim 10 wherein the standard was obtained from at least one other fuel rod within the fuel assembly.

13. The method of claim 10 including the step of shielding a second row in back of the row being scanned from the point heating source.

* * * * *